United States Patent [19]
Kulkens

[11] 3,931,467
[45] Jan. 6, 1976

[54] SYNCHRONIZING CIRCUIT HAVING A VARIABLE BANDPASS FILTER

[75] Inventor: John F. Kulkens, Park Ridge, Ill.

[73] Assignee: Warwick Electronics Inc., Chicago, Ill.

[22] Filed: Oct. 24, 1974

[21] Appl. No.: 517,545

[52] U.S. Cl............ 178/7.3 R; 178/69.5 TV
[51] Int. Cl.².......................... H04N 5/04
[58] Field of Search....... 178/7.3 R, 7.3 S, 69.5 TV, 178/69.5 G, 69.5 CB, DIG. 19; 331/17, 20; 325/489

[56] References Cited
UNITED STATES PATENTS

| | | | |
|---|---|---|---|
| 2,848,537 | 8/1958 | Richman | 178/69.5 CB |
| 2,962,666 | 11/1960 | Pollak | 331/20 X |
| 3,715,499 | 2/1973 | Steckler | 178/69.5 TV |
| 3,795,762 | 3/1974 | Willis | 178/7.3 R X |

Primary Examiner—Richard Murray
Assistant Examiner—Mitchell Saffian
Attorney, Agent, or Firm—Wegner, Stellman, McCord, Wiles & Wood

[57] ABSTRACT

In a television receiver, an automatic phase control includes a phase detector which generates a control signal passed by a bandpass filter to a horizontal oscillator in order to synchronize locally generated horizontal pulses with the received horizontal sync pulses. A keyed AGC circuit in response to increased received signal strength decreases the gain of the RF and IF amplifying stages. When the received signal strength reaches a preselected level, as occurs during off-the-air signal reception, the AGC signal actuates a transistor switch which widens the passband of the filter in order to increase the ability to lock onto irregular sync signals.

13 Claims, 2 Drawing Figures

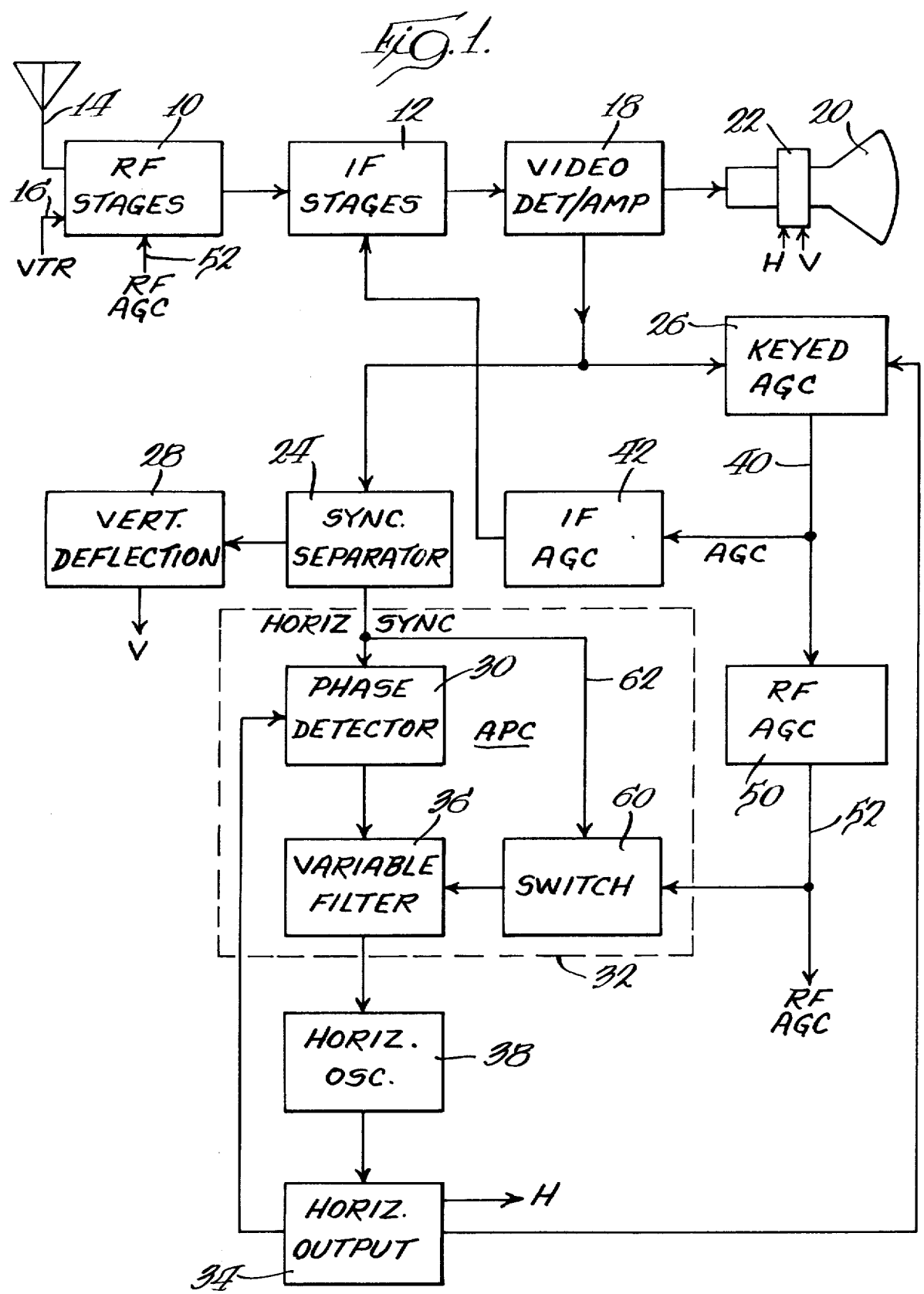

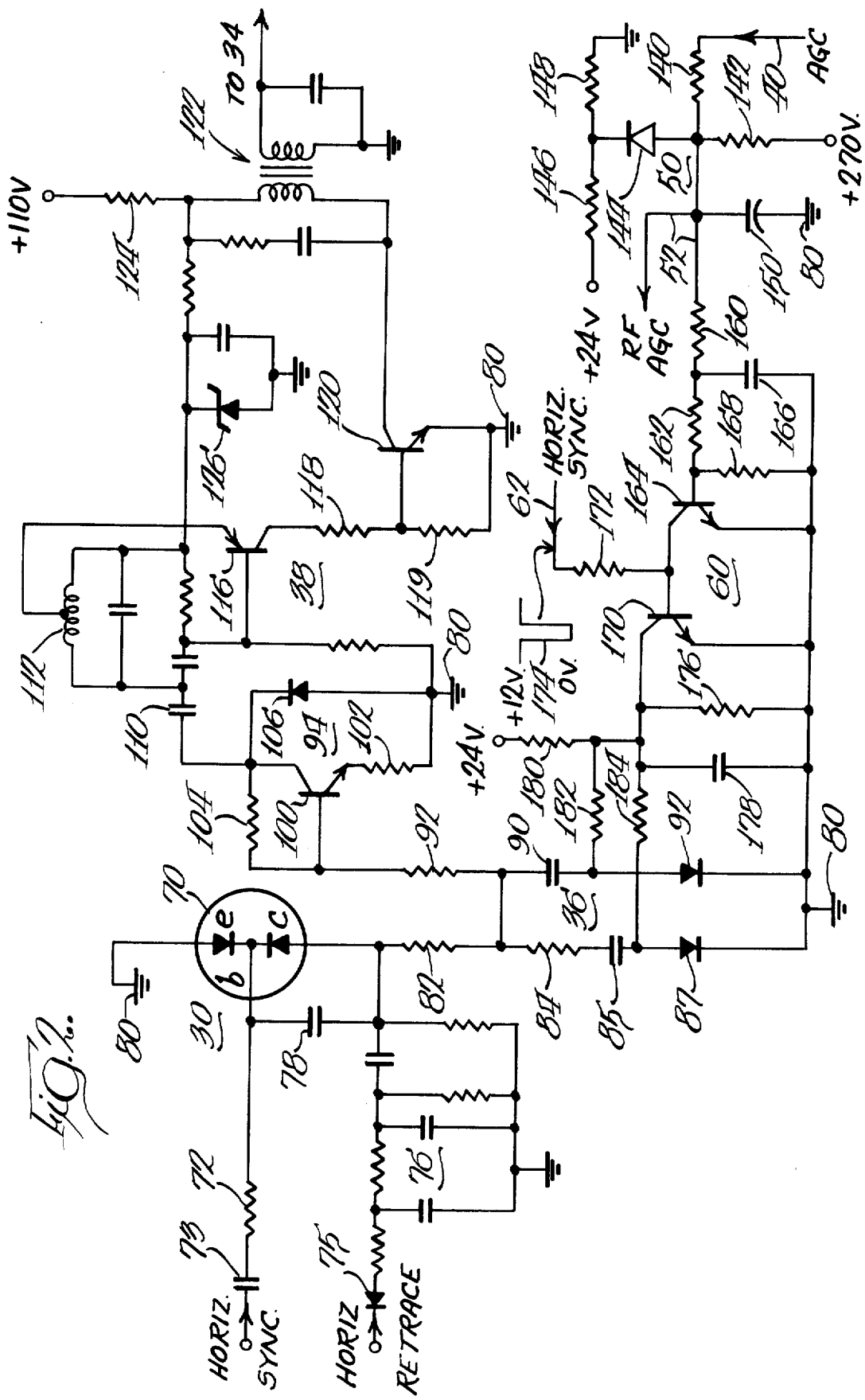

SYNCHRONIZING CIRCUIT HAVING A VARIABLE BANDPASS FILTER

BACKGROUND OF THE INVENTION

This invention relates to a receiver having a synchronizing circuit with a variable bandpass filter controlled by an automatic gain control signal.

When a conventional television receiver receives off-the-air signals, such as produced by a video tape recorder (VTR) or by cable television, a flagging or out-of-sync operation may occur because such off-the-air signals tend to have irregular sync pulses. As a result, the television receiver tends to show trace-shifts during portions of the field scan. This phenomenon is called flagging and is exhibited in the television picture as the bending of vertical lines in random fashion. This condition occurs because the passband of the filter in the horizontal phase control circuit is conventionally selected to be narrow in order to improve noise immunity during weak or normal broadcast signal reception.

To eliminate flagging or out-of-sync operation when a video tape recorder is to be utilized, it has been known to provide an external switch which converts the anti-hunt circuit in the horizontal oscillator from a narrow passband to a wide passband, such as shown in Willis U.S. Pat. No. 3,795,762. It would be desirable to provide automatic rather than manual modification of the deflagging circuit so as to eliminate any out-of-sync operation, whether caused by use of a VTR or by cable TV. It also would be desirable to not have to program the receiver in order to detect the particular channels which might receive cable TV signals and VTR signals.

Prior television receivers have automatically controlled the bandpass filter in the automatic phase control circuit in order to switch between narrow and wide passbands. For example, Richman U.S. Pat. No. 2,848,537 and Pollak U.S. Pat. No. 2,962,666 show APC circuits in which the passband is switched from narrow to wide in response to an out-of-sync condition. However, an out-of-sync condition has no correlation with the problem of off-the-air signal reception, and thus is not pertinent to the problem to which the present invention is directed.

It has been known in transistor circuits to provide an automatic gain and bandwidth control in order to minimize frequency shift. For example, Burger U.S. Pat. No. 2,774,866 shows a transistor circuit for a radio receiver in which an AGC signal varies the bandwidth of an amplifier to vary its damping and prevent the Q from rising due to an unloading action. However, this problem is not analagous to the problem of off-the-air signal reception in a receiver.

In a pending application Ser. No. 432,965 of Gregg et al., filed Jan. 14, 1974, entitled "Rate Modifier for a Television Deflection System", and assigned to the same assignee as the present application, automatic switching of the bandpass filter in the horizontal APC circuit from a narrow to a wide bandwidth has been accomplished under control of the vertical sync pulse. In particular, the detected presence of the vertical sync signal enables a switch which disables the noise filtering circuit in the horizontal AFC stage for a predetermined number of horizontal lines. This corrects for irregular sync pulses which tend to be generated by a VTR during the beginning of each vertical scanning period. However, such a system would not correct for irregular sync which occurred later in a field scan.

SUMMARY OF THE INVENTION

In accordance with the present invention, a receiver with a synchronizing circuit eliminates flagging or out-of-sync operation by controlling a variable bandpass filter by means of an AGC signal. In particular, the bandwidth of an APC circuit is made wide during strong signal reception, and narrow during weak signal reception. The applicant has recognized that off-the-air signals such as produced by a VTR or by cable TV, and in which synchronism is apt to be irregular, almost always have good signal strength. Thus, automatic control to eliminate out-of-sync operation can be accomplished by using the received signal strength as an indication that the received signals may have irregular sync. During the presence of weak signals, the APC circuit is switched back to its narrow bandwidth in order to provide noise immunity.

One object of the present invention is the provision in a receiver having a synchronizing circuit, of a variable bandwidth filter controlled by an automatic gain control circuit.

Other objects and features of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components in order to disclose a complete, operative embodiment of the invention. However, it should be understood that such values are merely representative and are not critical.

BRIEF DESCRIPTION OF THE DRAWINGS

FIG. 1 is a block diagram of a portion of a television receiver which incorporates a novel automatic phase control synchronizing circuit; and FIG. 2 is a schematic diagram showing in detail the phase detector, variable filter, horizontal oscillator, switch, and RF AGC circuits shown in block form in FIG. 1.

DESCRIPTION OF THE PREFERRED EMBODIMENT

Turning to FIG. 1, a television receiver includes variable gain RF stages 10 and variable gain IF stages 12 which amplify a composite television signal comprising an information component and a sync component. The composite signal is supplied by an antenna 14, or from an off-the-air input 16 which is provided for a video tape recorder (VTR) or for cable television. Alternatively, the local signal input 16 may be directly coupled to the antenna input 14 in some television receivers. The output of the IF stages 12 is coupled to a video detector/amplifier 18 which detects the composite signal and ultimately drives a cathode ray tube (CRT) 20. The raster of the CRT 20 is produced by a scanning or deflection yoke 22 which receives horizontal H and vertical V deflection waveforms from the synchronizing stages described below.

The horizontal sync component of the composite television signal is coupled from the video detector/amplifier 18 to a sync separator 24 and to a keyed AGC circuit 26. The sync separator 24 passes the vertical synchronizing component to a vertical deflection circuit 28 in order to generate the vertical V deflection waveform. The horizontal sync component detected by the sync separator 24 is coupled to a phase detector 30 which forms a part of the automatic phase control (APC) synchronizing circuit 32, sometimes also known as the automatic frequency control (AFC).

Phase detector 30 generates a correction signal representing the phase difference between the separated horizontal sync and the locally generated retrace pulses from a horizontal output stage 34. The horizontal output stage 34 also generates the horizontal deflection waveforms, H, coupled to the horizontal section of the yoke 22. The correction signal from the phase detector 30 is filtered in an anti-hunting or variable bandpass filter 36 and is coupled to the reactance circuit in a horizontal oscillator 38 in order to lock the locally generated horizontal sync pulses with the received sync pulses. The output of the horizontal oscillator 38 drives the horizontal output stage 34.

The composite video signal is coupled to the keyed AGC circuit 26 which is gated on by the horizontal retrace pulses generated by the horizontal output stage 34. During retrace time, the amplitude of the received sync pulse is sampled to develop an automatic gain control or AGC voltage on an output line 40. The AGC output line 40 is coupled to an IF AGC network 42, which may include an AGC level adjust, for coupling the AGC voltage to the IF stages 12 in order to control the gain of the stages 12 in inverse relation to the received signal strength. That is, as the received signal strength increases, the AGC signal goes more negative and decreases the gain of the IF stages 12. The AGC output line 40 is also coupled to an RF AGC network 50 which provides delayed AGC on an RF AGC output line 52. The RF AGC network 50 does not operate to decrease the gain of the RF stages 10 until the television signal strength exceeds a predetermined level. The above described components are conventional and will not be described further except with regard to the novel deflagging circuit of the present invention.

To eliminate out-of-sync operation during VTR and cable TV reception, in which irregular sync signals are more likely, the RF AGC output line 52 is coupled to a switch 60 which controls the bandwidth of the bandpass filter 36. During weak or normal broadcast signal reception, the switch 60 causes the bandpass filter 36 to have a narrow passband, as is conventional, for improved noise immunity. Since VTR and cable TV signals are generally strong, the RF AGC section of the television receiver is used as a detector of the probable presence of an VTR or cable TV signals. In particular, when a delayed RF AGC voltage is produced on line 52 indicating a strong signal, the switch 60 is effective to widen the passband of the filter 36 in order to improve the ability of the APC circuit to lock onto irregular sync signals. While noise immunity is also reduced, this is less of a problem with strong received signals, and thus the television receiver will work satisfactorily even if the received signals were normal broadcast signals. This automatic operation is adaptable to cable television, and to receivers in which the off-the-air signal may be coupled through the antenna input 14.

Switch 60 also has an input from the output line 62 of the sync separator 24 so that horizontal sync pulses will disable the switch 60 during retrace time. The bandpass filter 36 thus has a narrow bandwidth both during normal broadcast signal reception, and at retrace time even during strong signal reception. Therefore, the passband is widened only during trace time during strong signal reception. The reason for this is that correction is needed only during the visible or trace time. During retrace time the picture is blanked out anyway and hence no correction is needed here. Of course, the beginning of trace time is when the irregular sync signals may occur, and thus this is the time during which the frequency of the horizontal oscillator must be corrected in order to stay in sync with the rest of the traces of the entire field scan. It should be noted that since during the retrace period the picture is blanked out it really makes no or very little visible difference to connect switch 60 directly to a D.C. supply, as long as the received signal is strong and relatively noise free. While the illustrated filter 36 has only two bandwidths, it will be appreciated that the delayed RF AGC voltage could be utilized to continuously control the passband of the filter 36, if the filter 36 had a continuously adjustable tuning element.

Turning to FIG. 2 which illustrates in detail the APC circuit 32, the horizontal oscillator 38 and the RF AGC network 50, the phase detector 30 in the APC circuit includes a PNP silicon transistor 70 used as a dual diode in which the base $b$ is coupled through a resistor 72 and a coupling capacitor 73 to negative going horizontal sync pulses from the sync separator. The negative going horizontal retrace pulses from the horizontal output stage are coupled through a diode 75 to a wave shaping network 76 which converts the retrace pulses into sawtooth waveforms which are coupled through a capacitor 78 to the base $b$ of the dual diode transistor 70. The sawtooth waveforms are also coupled directly to the collector $c$, and the emitter $e$ is directly coupled to a source of reference potential or ground 80.

When the received horizontal sync pulses and the locally generated retrace pulses are in proper phase relationship, the phase detector output to a resistor 82 will be at a predetermined positive DC voltage. If the horizontal oscillator 38 is running at a higher frequency than the received horizontal sync pulses, the phase detector output will become more positive. Conversely, if the horizontal oscillator runs at a lower frequency, the output through resistor 82 will become less positive.

The resistor 82, which may be 47 kilohms, is part of the variable bandpass filter 36 which introduces a time delay in the DC control voltage from the phase detector 30. The bandpass filter also includes a 1.2 kilohm resistor 84 and a series connected 3μf capacitor 85 which is coupled through a diode 87 to ground 80. The series resistor 84 and capacitor 85 are shunted by a 0.047μf capacitor 90 which is coupled through a diode 92 to ground 80. The bandpass filter output is coupled through a 39 kilohm resistor 192 to a reactance circuit 94 which forms a part of the horizontal oscillator 38. The time constant of resistor 82 and capacitor 90 is sufficiently long to filter out noise and horizontal sync voltages. The relatively low resistance of resistor 84 serves as a damping resistor across capacitor 90, making the output voltage more resistive and less capacitive to reduce time delay in the control voltage. Capacitor 85 blocks the DC control voltage from shorting to chassis ground 80. The capacitance of capacitor 85 is large to provide a reactance low enough to put resistor 184 in parallel with capacitor 90 when the DC control voltage changes. The operation of the bandpass filter 36 will be described in more detail later in conjunction with the operation of the switch 60.

Reactance circuit 94 includes an NPN transistor 100 having its emitter coupled through a resistor 102 to ground 80. A 470 kilohm resistor 104 connects the base to the collector, and the collector is coupled to ground 80 through a diode 106. The output of the transistor 100 is connected through a capacitor 110 to an oscillator coil 112 of the horizontal oscillator 38. When the phase detector output becomes more positive due to an increase in oscillator frequency, the reactance transistor 100 conducts more heavily, thereby lowering its internal resistance. This reduces the reactance of the combination of capacitor 110, transistor 100, and resistor 102, and increases the capacitive effect, so that the oscillator circuit is tuned to a lower frequency. This will bring the horizontal oscillator back into phase with the horizontal sync signal. The opposite action takes place as the output of the phase detector is less positive as occurs when the oscillator is at a lower frequency than the sync signal.

Horizontal oscillator 38 employs a PNP transistor 116 in a Hartley oscillator circuit. This circuit generates a sine wave signal at the horizontal frequency, which is developed across the voltage divider consisting of a resistor 118 and a resistor 119. The junction of these resistors is coupled to the base of a horizontal driver transistor 120. The transistor 120 operates as a Class B amplifier in that it conducts only on the positive excursions of the sine wave signal. Since the emitter of transistor 120 is coupled directly to ground 80, the device is driven into saturation. The output signal developed at the collector of transistor 120 is a square wave at the horizontal frequency. This square wave is coupled by means of a pulse transformer 122 to the horizontal output stage 34. The primary of the pulse transformer 122 is coupled through a resistor 124 to +110 volts DC. This signal is dropped through a Zener diode 126 to a value, such as 24 volts, in order to power the remaining part of the oscillator circuit.

The keyed AGC circuit develops on AGC output line 40 a negative AGC voltage which is proportional in absolute value to the received signal strength. The negative AGC voltage is coupled to the delayed RF AGC network 50 through a 2.2 megohm resistor 140. The network includes a 20 megohm resistor 142 which is coupled to +270 volts DC. The opposite side is coupled to the RF AGC output line 52 and is also coupled to the anode of a diode 144 having its cathode coupled to a voltage divider consisting of a 27 kilohm resistor 146 and a 6.8 kilohm resistor 148 coupled between +24 volts DC and ground 80. A capacitor 150 shunts any alternating current signal on the AGC line 40 to ground. The network 50 creates an RF "delay" function because a high negative AGC voltage must be developed before it can overcome the positive voltage on line 52. When the AGC voltage becomes sufficiently negative, due to a strong received TV signal, the normally forward biased diode 144 becomes back biased and the RF AGC voltage on line 52 will now go negative in proportion to the negative going AGC signal.

The RF AGC voltage on line 52 is coupled through a pair of resistors 160 and 162 to the base of a switching transistor 164 which is a part of the switch 60. A capacitor 166 shunts the junction of resistors 160 and 162 to ground 80. A resistor 168 shunts the base of transistor 164 to ground 80. The collector of transistor 164 is directly coupled to the base of a switching transistor 170. The emitters of both transistors 164 and 170 are directly coupled to ground 80. The base of transistor 170 is also coupled through a resistor 172 to the horizontal sync line 62 which carries horizontal sync pulses 174. The line 62 normally is at a +12 volt DC level, and goes negatively to zero volts when the sync pulse is present. The collector of transistor 170 is coupled to ground 80 through a resistor 176 and a capacitor 178. The collector is also coupled to a voltage divider formed by a resistor 180 having one side coupled to +24 volts, and its other side coupled through a resistor 182 to diode 92, and through a resistor 184 to diode 87.

The operation of the switch 60 is as follows. At all times during weak and medium strength received composite TV signals, the negative AGC voltage on line 40 is not sufficient to overcome the switching voltage of the delayed AGC network 50, so that a positive voltage remains present on the RF AGC line 52. This forward biases transistor 164 and maintains transistor 170 in its off state. As a result, the diodes 87 and 92 are forward biased so that the capacitors 85 and 90 are effectively grounded, and a narrow passband or bandwidth is provided. The presence of the negative going horizontal sync pulse 174 has no effect at this time because the transistor 170 is already in its nonconductive state.

When the received composite signal becomes sufficiently strong, the negative AGC voltage will overcome the switching point of the network 50 and the voltage on line 52 will proceed to go in a negative direction. As this voltage drops below the voltage necessary to forward bias the base-emitter junction of transistor 164, the transistor 164 is driven off, causing transistor 170 to be forward biased by the +12 volt DC level on line 62. This shorts out the forward bias at the anodes of diodes 87 and 92, and thus lifts the anti-hunt network off ground through resistors 182 and 184, altering the time constant in a direction which provides a wide bandwidth. The horizontal synchronizing circuit can now lock onto any irregular sync pulses such as tend to occur with VTR and cable TV signals which in turn have a strong signal strength.

During strong signal reception when transistor 170 is saturated, the switch 60 is effective to reduce or narrow the bandwidth during retract time. The negative going horizontal sync pulse 174, when present, causes transistor 170 to become nonconductive. This allows the diodes 87 and 92 to become again forward biased, and thus narrow the bandwidth of the bandpass filter 36. At the end of retrace time, the line 62 returns to its +12 volt level which forward biases the transistor 170 and thus returns the circuit to the wide bandwidth condition. The use of the horizontal sync signal to narrow the bandwidth during the retrace period of strong signal reception is optional and merely adds noise immunity during that interval. As explained above the sync input on line 62 could be replaced with a 12 volt DC voltage source.

While the present circuit has been illustrated as switching at a preselected AGC level, herein as determined by the RF delay network, it will be appreciated that the circuit could continuously vary the bandwidth under control of the AGC voltage, by using continuously adjustable tuning elements in the filter 36. Other changes will be apparent in view of the above teachings.

Having described the invention, the embodiments of the invention in which an exclusive property or privilege is claimed are defined as follows:

1. In a receiver having a variable gain amplifier stage for amplifying a composite signal including an information component and a sync component, and an AGC circuit for generating an automatic gain control signal which controls the gain of the amplifier stage in response to the received signal strength, the improvement comprising:
   synchronizing means for generating a sync pulse which is synchronized with the sync component including
   a bandpass filter having a bandwidth variable to alter the ability of the synchronizing means to synchronize onto the sync components; and
   means coupling the AGC circuit to the bandpass filter for varying the bandwidth under control of the automatic gain control signal.

2. The improvement of claim 1 wherein the coupling means is responsive to widen the bandwidth of the bandpass filter when the automatic gain control signal decreases the gain of the amplifier stage in response to increased signal strength.

3. The improvement of claim 2 wherein the bandpass filter has a first state providing a narrow bandwidth and a second state providing a wide bandwidth, and the coupling means comprises switch means responsive when the automatic gain control signal exceeds in absolute value a preselected switching point for switching the state of the bandpass filter from the narrow bandwidth to the wide bandwidth.

4. The improvement of claim 3 wherein the AGC circuit includes a delayed AGC network for decreasing the gain of the amplifier stage only when the automatic gain control signal exceeds a predetermined level, and the switch means is coupled to the delayed AGC network whereby the preselected switching point of the bandpass filter is not less than the predetermined level of the delayed AGC network.

5. The improvement of claim 1 wherein the coupling means includes modification means coupling the synchronizing means to the bandpass filter for altering the bandwidth in synchronism with the occurrence of a sync component.

6. The improvement of claim 5 wherein the coupling means widens the bandwidth of the bandpass filter in response to an automatic gain control signal which represents increasing signal strength, and the modification means is responsive at the occurrence of the sync components to narrow the bandwidth of the bandpass filter when the bandwidth has been widened by the coupling means.

7. In a television receiver having a variable gain RF amplifier stage and a variable gain IF amplifier stage for amplifying a composite television signal including an information component and a sync component, a sync separator for detecting the sync component, oscillator means for generating scanning signals synchronized with the detected sync component, and an AGC circuit responsive to the received strength of the composite television signal for generating an automatic gain control signal coupled to the amplifier stages to control the gain thereof, an automatic phase control circuit comprising:
   a phase detector coupled to the sync separator and the oscillator means for generating a control voltage corresponding to the phase difference between the detected sync component and the scanning signals;
   a controllable bandpass filter for coupling the control voltage from the phase detector to the oscillator means and having a narrow bandwidth for noise immunity; and
   switch means coupling the AGC circuit to the controllable bandpass filter for widening the bandwidth of the bandpass filter in response to automatic gain control signals which decrease the gain of the amplifier stages in response to increased signal strength.

8. The automatic phase control circuit of claim 7 wherein the AGC circuit includes an IF AGC network for coupling an IF automatic gain control signal to the IF amplifier stage, and an RF AGC network for coupling a delayed automatic gain control signal to the RF amplifier stage to decrease the gain of the RF amplifier stage only when the received signal strength exceeds a preselected level, and the switch means is coupled to the RF AGC network to widen the bandwidth of the bandpass filter in response to the delayed automatic gain control signal.

9. The automatic phase control circuit of claim 8 wherein the RF AGC network includes a semiconductor switching device coupled between two sources of different DC voltage levels, bias means for maintaining the semiconductor switching device in a preselected state until the automatic gain control signal equals the preselected level, and the switch means is responsive only when the semiconductor switching device switches out of its preselected state to switch the bandpass filter from the narrow bandwidth to the wide bandwidth.

10. The automatic phase control circuit of claim 7 wherein the bandpass filter includes an RC means for controlling the passband of the filter, and the switch means is responsive to a preselected level of the automatic gain control signal for altering the time constant of the RC means to widen the passband of the filter.

11. The automatic phase control circuit of claim 10 wherein the switch means includes a diode for coupling the RC means to a source of reference potential, a switching device coupled to the AGC circuit for switching between conductive and nonconductive states in response to the level of the automatic gain control signal, and means coupling the switching device to the diode to effectively enable and disable the diode to connect the RC means to the source of reference potential.

12. The automatic phase control circuit of claim 11 wherein the means coupling the switching device to the diode includes a bias source, resistor means connecting the bias source to the diode to forward bias the diode and effective to connect the RC means to the source of reference potential, and the switching device is effective to shunt the bias source to cause the RC means to be coupled to the source of reference potential through at least a portion of the resistor means.

13. The automatic phase control circuit of claim 7 wherein the switch means comprises a first switching device coupled to the AGC circuit for switching states to widen the bandwidth of the bandpass filter in response to an automatic gain control signal corresponding to a received composite signal of increased strength, and a second switching device coupled to the sync separator and responsive to the separated sync component for switching states to narrow the bandwidth of the bandpass filter.

* * * * *